United States Patent [19]

Fechner

[11] Patent Number: 4,563,673

[45] Date of Patent: Jan. 7, 1986

[54] ANTI-THEFT ALARM DEVICE FOR VIDEO CASSETTE RECORDER

[75] Inventor: Heinz J. B. Fechner, Sunderland, England

[73] Assignee: Vainaga Limited, Sunderland, England

[21] Appl. No.: 596,300

[22] Filed: Apr. 3, 1984

[30] Foreign Application Priority Data

Feb. 1, 1984 [EP] European Pat. Off. ....... 84.300628.9

[51] Int. Cl.⁴ .............................................. G08B 13/14
[52] U.S. Cl. .................................... 340/568; 340/693; 360/132; 360/137
[58] Field of Search ............... 340/568, 571, 689, 693; 360/60, 132, 137

[56] References Cited

U.S. PATENT DOCUMENTS

| 3,644,921 | 2/1972 | Duggan et al. | 340/689 X |
| 4,023,157 | 5/1977 | Miller | 340/571 |
| 4,188,648 | 2/1980 | Guerini | 360/105 |
| 4,316,181 | 2/1982 | Primont | 340/693 X |

OTHER PUBLICATIONS

IBM Technical Disclosure Bulletin, Vol. 15, #9, Feb. 1973, "Lock for Magnetic Disk Drive Units" by C. W. Meyers.

Primary Examiner—James L. Rowland
Assistant Examiner—Jeffery A. Hofsass
Attorney, Agent, or Firm—Hopgood, Calimafde, Kalil, Blaustein & Judlowe

[57] ABSTRACT

An anti-theft alarm device for a video cassette recorder comprises a housing in which is mounted an abutment member pivotal between an inoperative position within the housing and an operative position projecting from the housing by appropriate operation of an associated control mechanism. On location of the housing in the cassette-receiving mechanism of a recorder and with the abutment member in its operative position, said member co-operates with the recorder such as to prevent removal of the housing other than by actuation of the control mechanism. Also mounted in the housing is a battery-operated electrical switching mechanism including a movement-sensitive electric switch movable between an inoperative position and an operative position and a warning mechanism the circuit of which is completed on movement of the switch to its operative position.

7 Claims, 5 Drawing Figures

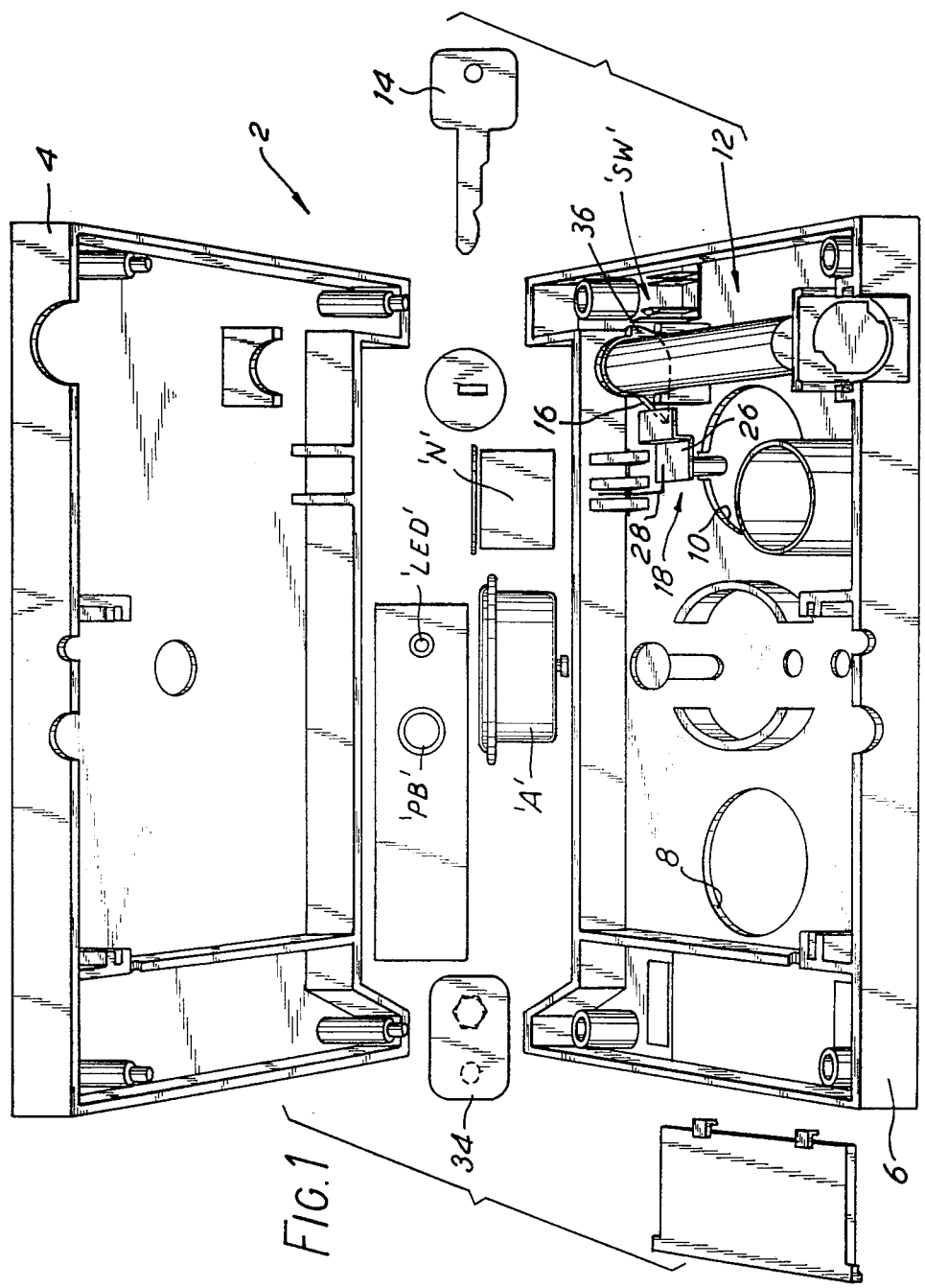

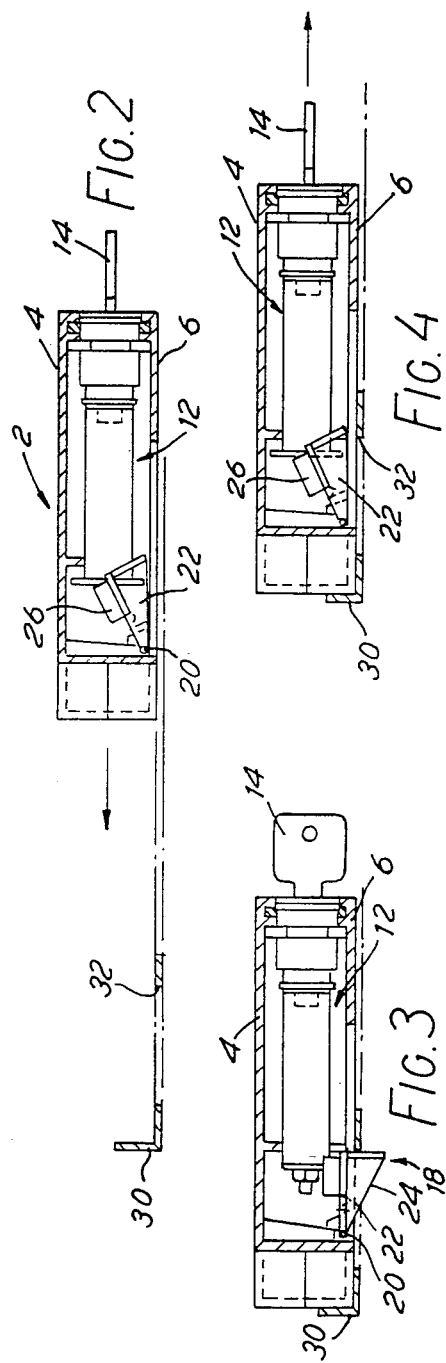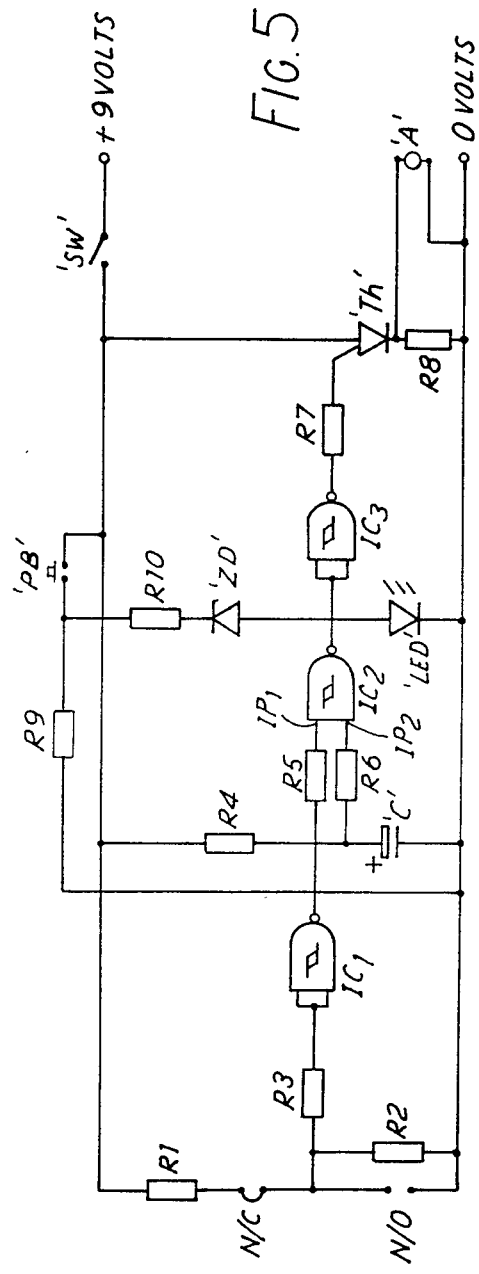

Preferably the key-hole of the lock projects inwardly of the housing from the front face of said housing, while the abutment member, in its operative position, projects downwardly through the bottom surface of the housing and co-operates with an edge of the cassette-receiving mechanism.

BRIEF DESCRIPTION OF THE DRAWINGS

FIG. 1 is an exploded view of an anti-theft alarm device according to the invention, FIG. 2 is a section through the device of FIG. 1 about to be inserted into a cassette-receiving mechanism with the abutment member in its inoperative position;

FIG. 3 is the section of FIG. 2 with the device inserted into, the cassette-receiving mechanism and with the abutment member in its operative position;

FIG. 4 is the section of FIG. 3 with the abutment member in its inoperative position, the device about to be withdrawn from the cassette-receiving mechanism, and FIG. 5 is a circuit diagram of the electrical switching mechanism of a device according to the invention.

DESCRIPTION OF THE PREFERRED EMBODIMENT

Referring to the drawings, the illustrated device comprises a housing indicated generally at 2 and including upper and lower portions 4,6. The housing 2 is of generally rectangular configuration and of dimensions substantially the same as those of a conventional video cassette, either of the Beta or VHS type, while the lower portion 6 of the housing is formed with conventionally-spaced capstan-receiving holes 8,10, all for reasons which will become apparent.

Mounted within the housing 2 is a cylindrical lock 12 operated by a key 14, the key-hole end of the lock being substantially flush with the front face of the housing and the other end of the lock carrying a first projection 16 movable, on rotation of the key 14, between first and second positions within the housing.

An abutment member 18 is mounted in the housing 2 to be pivotal about a substantially horizontal axis 20, the member 18 including a body portion 22 having a substantially vertical front face and an upwardly and rearwardly inclined lower face 24. The member 18 further includes a step-like upper portion 26, a lower surface of the upper step of which engages with the projection 16 of the lock 12. A spring 28 engages with the upper surface of the lower step of the portion 26 of the member 18 to urge said member towards an operative position shown in FIG. 1 and 3 in which the body portion 22 extends through a slot in the lower surface of the housing 2, said position being determined by engagement of the lower surface of the lower step of the portion 26 of the member 18 with the inner face of the bottom wall of the portion 6 of the housing 2.

Location of the abutment member in its inoperative position within the housing 2, as in FIGS. 2 and 4 or in its operative position projecting from the housing 2, as in FIGS. 1 and 3, is determined by the position of the first projection 16, which position is in turn determined by the position of the lock 12.

With the lock in the first position of FIGS. 2 and 4 the first projection 16 abuts against the lower surface of the upper portion 26 of the member 18 to hold said member in its inoperative position within the housing 2 against the bias of the spring 28.

On turning the key 14 to move the lock into its second position, the projection 16 is released from forcible engagement with the portion 26 of the member 18 and said member is urged into its operative position of FIG. 1 and 3 by the spring 28. Clearly reverse rotation of the key 14 will return the member 18 to its inoperative position within the housing 2.

The arrangement so far described operates as follows. The tray of the cassette-receiving mechanism of a video cassette recorder is shown at 30 in FIGS. 2 to 4 and the housing 2 is inserted into the tray 30 in the manner of a conventional cassette. In the case of top-loading recorders, the abutment member 18 can be in its inoperative position within the housing 2 as shown in FIG. 2. Once the housing 2 is in position within the tray 30, the key 14 is turned in the lock 12 whereby the abutment member 18 projects from the housing 2 to engage with an edge 32 of the tray 30 to prevent removal from the tray other than by reverse rotation of the key 14. The cassette-receiving mechanism, together with the housing 2 are then pushed into an operative 'play' or 'record' position within the recorder, the capstans of the recorder passing through the holes 8,10 in the lower portion 6 of the housing 2.

In an alternative method of loading such a recorder with the housing 2, the abutment member 18 may initially be in its operative position projecting from the housing 2, engagement of said member 18 with the tray 30 during loading of the housing 2 into the cassette-receiving mechanism biasing said member 18 into its inoperative position. As soon as the member 18 passes the edge 32 of the tray 30, said member springs into its operative position to engage with said edge and prevent removal of the housing 2 from the recorder other than by use of the key 14.

In the case of front-loading machines where initial insertion of a cassette into the cassette-receiving mechanism is immediately followed by automatic feeding of the cassette and mechanism into an operative position within the machine, which does not permit rotation of the key 14 after said initial insertion, the housing is loaded with the abutment member 18 in its operative position projecting from the housing, in a similar manner to the alternative method detailed above in connection with top-loading recorders.

Also mounted in the housing 2 is an electrical switching mechanism powered by a battery 34 and including a movement-sensitive electric switch 'N', which may be, for example, a mercury tilt switch, hydroswitch or the like which reacts to any displacement thereof, and an audible electro-mechanical alarm 'A' actuation of which is dependent upon the condition of the switch 'N'.

The switching mechanisms further includes an 'on-off' switch 'SW' located adjacent the other end of the lock 12, said end of the lock carrying, as well as the first projection 16, a further projection 36 adapted to co-operate with the switch 'SW'. The arrangement is such that, with the lock 12 in its first position as shown in FIGS. 2 and 4, the projection 36 engages with the switch 'SW' to open said switch and de-activate the electrical switching mechanism. With the lock in its second position, as shown in FIGS. 1 and 3, the switch 'SW' is closed to activate the circuit, actuation of the alarm 'A' then being dependent upon the condition of the switch 'N'.

Referring to FIG. 5, which illustrates the circuit of the electrical switching mechanism and which is totally

4,563,673

ANTI-THEFT ALARM DEVICE FOR VIDEO CASSETTE RECORDER

BACKGROUND OF THE INVENTION

This invention relates to anti-theft alarm devices for video cassette recorders.

It is well recognised that video cassette recorders, particularly those in domestic residences, are prime targets for would-be thieves, and various alarm devices have been proposed heretofore with a view to preventing or deterring thefts of such machines. However, all known alarm devices suffer from one or more disadvantages.

For example, pressure mats have been provided to receive thereon video cassette recorders, such mats incorporating electrical circuits actuation of which is dependent upon the presence or otherwise of outside pressure on the mat. Thus, with the recorder in position on the mat, an alarm device associated with the circuit is deactivated because of the weight of the recorder. However, as soon as the machine is removed from the mat, the state of the circuit is altered and the alarm is activated. Such mats, as well as being clearly visible, rely for their operation upon the resiliency of the material of the mat which must be such as to effect a change in state of the circuit on removal of pressure therefrom. However the continuous presence of a heavy machine in one position on the mat cause compaction of the material of the mat such that the resiliency initially inherent therein is reduced or eliminated whereby the mat fails to operate on removal of the machine therefrom.

Further known anti-theft devices comprise housings for attachment to the body of the machine, said housings containing movement-sensitive switches which, on any displacement of the video cassette recorder from a normal rest position, are actuated to complete an electrical warning circuit. Such switches may be for example, mercury tilt switches or hydroswitches.

Alternatively, said housings may contain ultrasonic Doppler systems including transmitters and receivers so arranged that any interruption of the transmitted sound waves, be it by movement of the machine itself or as a result of the interference of a moving object remote from the machine, causes actuation of a warning mechanism.

It will be appreciated that the presence of all the above-detailed devices is readily apparent to a potential thief and he can himself take steps towards de-activating any such device—for example by disconnection from the supply of mains electricity or from the associated battery.

SUMMARY OF THE INVENTION

It is an object of the present invention to provide an anti-theft alarm device for a video cassette recorder the presence of which cannot be immediately determined and deactivation of which cannot be readily achieved.

According to the present invention there is provided an anti-theft alarm device for a video cassette recorder comprising a housing for location in the cassette-receiving mechanism of the recorder, an abutment member mounted in said housing and movable, by means of a control mechanism operable from externally of the housing, between an inoperative position within the housing and an operative position projecting from the housing, and a battery-operated, movement-sensitive electrical switching mechanism contained within said housing and including a switch movable between an inoperative position and an operative position, and a warning mechanism the circuit of which is completed on movement of said switch to its operative position, the arrangement being such that, on location of the housing in the cassette-receiving mechanism and with the abutment member in its operative position, said member co-operates with the recorder to prevent removal of the housing from the cassette-receiving mechanism other than by actuation of said control mechanism to move the abutment member to its inoperative position and subsequent withdrawal of the device from said cassette receiving mechanism.

In use of such a device to protect a video cassette recorder, the housing is inserted into the cassette-receiving mechanism and is then moved into position within the machine equivalent to the 'play' position for a standard video cassette, the control mechanism having been operated to move the abutment member into a position projecting from the housing and engaging with an edge of, for example, the cassette-receiving mechanism. The circuit of the electrical switching mechanism is open but is primed for movement of the switch to its operative position. If the video cassette recorder is displaced from its rest position, the switch is moved to its operative position and the associated warning mechanism, which is preferably of an audible nature, is actuated.

Depression of the 'eject' control on the recorder will then present the housing for removal from the cassette-receiving mechanism but, because of the cooperation between the abutment member and the recorder, the housing cannot be removed without first of all retracting the abutment member by operation of the associated control mechanism.

This control mechanism is preferably a key-operated lock and it will thus be appreciated that anyone, such as a potential thief, without the correct key cannot remove the alarm device nor can he deactivate it. The key-operated lock may include a movable member co-operating with the abutment member such that rotation of the key in the lock between a rest position and a displaced position effects displacement of said movable member and consequential movement of the abutment member between its inoperative position and its operative position.

Conveniently the abutment member is resiliently-biased towards its operative position such that said abutment member can be displaced from its operative position to its inoperative position by the application thereto of a force opposing the resilient bias and independently of actuation of the control mechanism.

In a preferred device the movable member of the lock further co-operates with the electrical switching mechanism in such a manner that, with the lock in its rest position, the circuit of said switching mechanism is broken and with the lock in its displaced position, said circuit is primed for completion by the switch on subsequent movement of said switch from its inoperative position to its operative position.

In such a device, the circuit of the electrical switching mechanism may include a time delay such that said circuit cannot be completed by movement of the switch from its inoperative position to its operative position for a predetermined period after initial rotation of the lock to its displaced position.

contained within the housing 2, the components 'N', 'A' and 'SW' are as detailed above, with the contacts N/C of the switch 'N' being those normally closed with said switch in its normal undisturbed condition and the contacts N/O being those normally open with the switch in said condition. The remaining components of the circuit are as follows:

| | | |
|---|---|---|
| R1 | 1 m.ohm | |
| R2 | 10 m.ohm | |
| R3 | 56 k.ohm | |
| R4 | 470 k.ohm | |
| R5 | 4.7 k.ohm | |
| R6 | 4.7 k.ohm | |
| R7 | 1 k.ohm | |
| R8 | 1 k.ohm | |
| R9 | 22 ohm | |
| R10 | 100 ohm | |
| IC$_1$ | | |
| IC$_2$ | } NAND Schmitt gates | |
| IC$_3$ | | |
| C | 47 µF 16 volt electrolytic capacitor | |
| Th | thyristor | |
| ZD | Zener diode 3V3 | |
| LED | 5 mm standard red light emitting diode | |
| PB | push-button switch | |

The circuit comprises four main sections, namely
(a) tilt switch detection stage
(b) time-delay stage
(c) output stage
(d) battery-test stage Stage (a)

This stage of the circuit consists of a voltage divider comprising resistors R1 and R2 such that the divided voltage is fed into the NAND Schmitt gate IC$_1$ via resistor R3. With the contacts N/C open—i.e. the tilt switch N actuated—the output from IC$_1$ is 'high', while the consequential closing of contacts N/O to short-circuit resistor R2 results in the input to IC$_1$ being 'low', further causing the output from IC$_1$ to be 'high'.

Stage (b)

This stage of the circuit consists of resistor R4, capacitor 'C' and the NAND Schmitt gate IC$_2$. When switch 'SW' is initially switched on to complete the circuit, capacitor 'C' charges up at a predetermined rate set by resistor R4, the voltage being fed to input IP$_1$ of gate IC$_2$. When this input reaches $\frac{2}{3}$ of the supply voltage, IC$_2$ then transmits any signal received from IC$_1$, a 'high' on the input IP$_2$ of IC$_2$ resulting in a 'low' at the output from IC$_2$. The gate IC$_3$ merely inverts the output from IC$_2$.

Stage (c)

This stage of the circuit consists of the thyristor 'Th' and resistor R7. When the output from gate IC$_2$ is 'high', the thyristor 'Th' starts conducting and the alarm 'A' is actuated The resistor R8 is connected between the cathode of the thyristor and ground to prevent the thyristor from turning off as would otherwise happen because of the type of electromechanical alarm used.

Stage (d)

This stage of the circuit consists of resistors R9 and R10, Zener diode 'ZD', light-emitting diode 'LED' and the push-button 'PB'. When push-button 'PB' is pressed, resistor R9 acts as a load across the voltage supply and, if the supply battery is still well charged, there will only be a slight voltage drop causing the diode 'ZD' to conduct and the diode 'LED' to light up. If the battery is low, the voltage drop is much bigger and, at a certain predetermined level, the diode 'ZD' does not conduct and the diode 'LED' does not light up, indicating that the battery needs changing.

In FIG. 1, the push button 'PB' and diode 'LED' can be seen to be mounted in the front wall of the housing 2.

Thus it will be appreciated that turning of the key 14 to move the lock from its first position to its second position whereby the abutment member 18 moves to its operative position also results in switch 'SW' being turned on to activate the circuit of FIG. 5. However the time delay effected by stage (b) of the circuit, typically 10 to 15 seconds, postpones any alteration of the condition of this circuit by the switch 'N' for this period such that the housing and tray 30 can be fed from the position of FIG. 4 into the recorder without actuation of the alarm 'A'. However, once the cassette-receiving mechanism is within the recorder and said period has passed, any movement of the machine will result in completion of the contacts N/O and consequential actuation of the alarm 'A' as detailed above.

This alarm can only be switched off by ejecting the cassette-receiving mechanism to present the front wall of the housing 2 for insertion of the key 14 into the lock 12 whereby the switch 'SW' can be turned to the 'off' position. Turning of the switch 'SW' is accompanied by movement of the abutment member 18 to its inoperative position whereby the housing 2 can be withdrawn from the recorder.

Thus there is provided an anti-theft alarm device which is completely self-contained within a housing 2 and which can be located within a recorder so as not to be visible to a potential thief. Any unauthorised movement of the machine will activate the audible alarm which cannot be turned off without the correct key 14 for the lock 12.

What I claim and desire to secure by Letters Patent is:

1. An anti-theft alarm device for a video cassette recorder comprising a housing for location in the cassette-receiving mechanism of the recorder, an abutment member mounted in said housing, a control mechanism operable from externally of the housing for moving the abutment member between an inoperative position within the housing and an operative position projecting from the housing, and a battery-operated, movement-sensitive electrical switching mechanism contained within said housing and including a switch movable between an inoperative position and an operative position, and a warning mechanism the circuit of which is completed on movement of said switch to its operative position, the arrangement being such that, on location of the housing in the cassette-receiving mechanism of the recorder and with the abutment member in its operative position, said member co-operates with the recorder to prevent removal of the housing from the cassette-receiving mechanism other than by actuation of said control mechanism to move the abutment member to its inoperative position and subsequent withdrawal of the device from said cassette-receiving mechanism.

2. An anti-theft alarm device as claimed in claim 1 in which the control mechanism comprises a key-operated lock including a movable member co-operating with the abutment member such that rotation of the key in the lock between a rest position and a displaced position effects displacement of said movable member and consequential movement of the abutment member between its inoperative position and its operative position.

3. An anti-theft alarm device as claimed in claim 2 and including resilient means biasing the abutment member towards its operative position such that said abutment member can be displaced from its operative position to its inoperative position by the application thereto of a force opposing the resilient bias and independently of actuation of the control mechanism.

4. An anti-theft alarm device as claimed in claim 2 in which the movable member of the lock further co-operates with the electrical switching mechanism in such a manner that, with the lock in its rest position, the circuit of said switching mechanism is broken and, with the lock in its displaced position, said circuit is primed for completion on subsequent movement of said switch from its inoperative position to its operative position.

5. An anti-theft alarm device as claimed in claim 4 in which the circuit of the electrical switching mechanism includes a time delay such that said circuit cannot be completed by movement of the switch from its inoperative position to its operative position for a predetermined period after initial rotation of the lock to its displaced position.

6. An anti-theft alarm device as claimed in claim 2 in which the key-hole of the lock projects inwardly of the housing from the front face of said housing.

7. An anti-theft alarm device as claimed in claim 6 in which, in its operative position, the abutment member projects downwardly through the bottom surface of the housing and co-operates with an edge of the cassette-receiving mechanism.

* * * * *